UNITED STATES PATENT OFFICE.

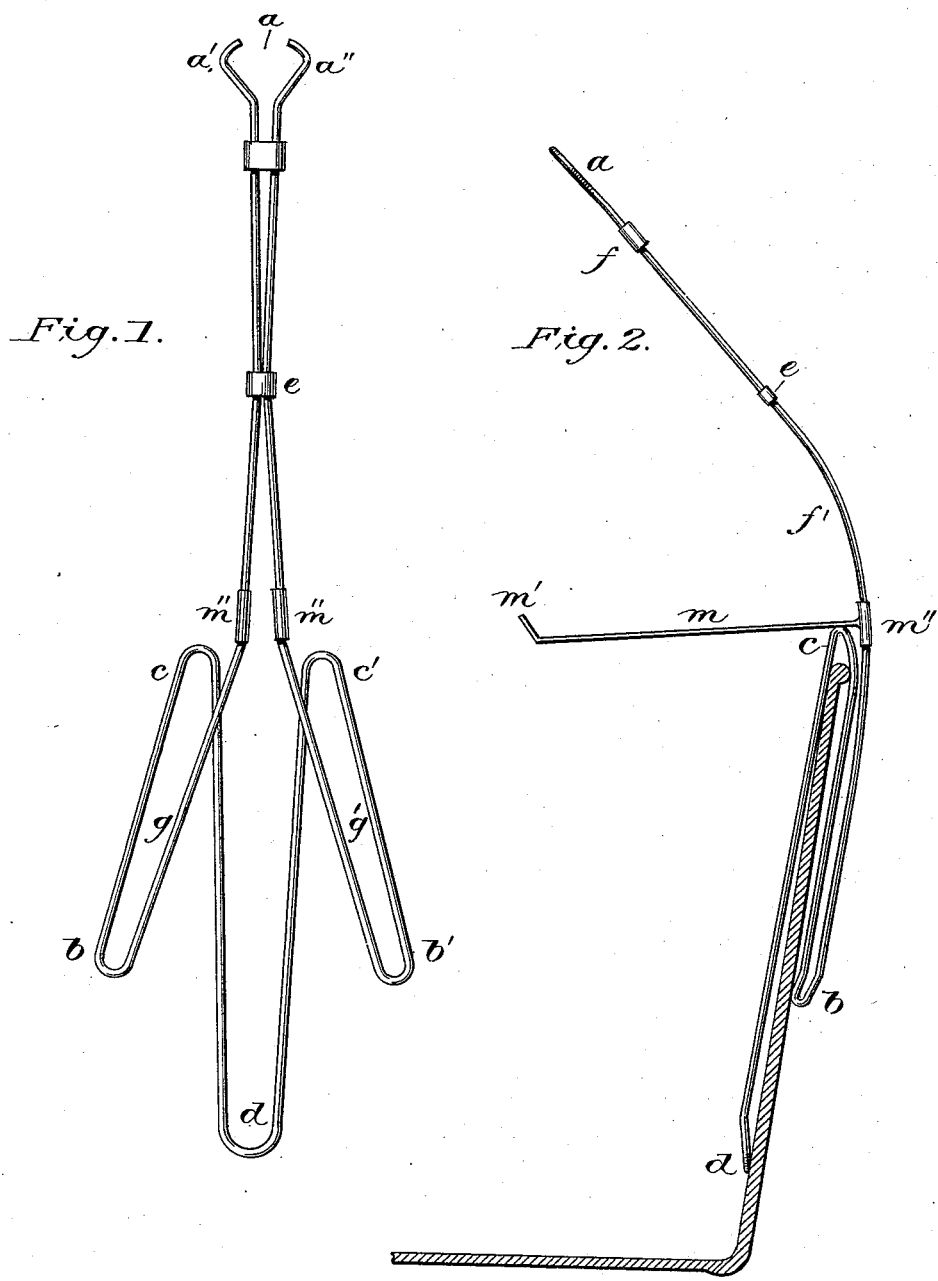

GEORGE WASHINGTON BABCOCK, OF ITHACA, NEW YORK.

SPOON-HOLDER.

SPECIFICATION forming part of Letters Patent No. 484,081, dated October 11, 1892.

Application filed January 5, 1892. Serial No. 417,127. (No model.)

*To all whom it may concern:*

Be it known that I, GEORGE WASHINGTON BABCOCK, a citizen of the United States, residing at Ithaca, Tompkins county, New York, have invented an Improved Implement for Holding Forks, Spoons, and Like Articles Designed Especially for Use in Cooking, of which the following is a specification, reference being had to the accompanying drawings.

My invention relates to an implement made, preferably, of elastic steel wire. The said steel wire is bent into the shape indicated in the drawings, and the nature of my invention will be apparent as I describe it.

Figure 1 is an elevation of my implement, the top not being bent to the curve seen in Fig. 2; and Fig. 2 is a side elevation at right angles to the first figure.

In the drawings, $a$ indicates one end of the wire bent in a hook shape, whence the wire continues downward to the lateral bend $b$, where it is reflected upward to another bend $c$, whence it continues downward to the bend $d$. This makes one half of the implement, the other half being similar in shape. At the place marked $e$ the two halves are bound or soldered to each other, and thence upward to the two hooks $a'$ $a''$, these ends act as springs to give the distance apart for the hooks for the width of the spoon or fork-handle, a sliding tie $f$ regulating the distance apart of the hooks.

In Fig. 2 there is indicated a part of a cooking-vessel to which the three parts made by the bendings described by their elasticity hold the implement, as indicated, the lower or longer part going into the inside and the two least in length being placed on the outside of the vessel. By the long curve just below the united place $e$ the upper end of my implement is made to extend over the inside of the vessel, and thus the spoon, fork, or knife or like article is held out of the contents of the vessel, yet with its lower end in a position in which any dripping off of it will be into the vessel and far enough above the vessel to allow the handle at all times to be cool enough for the grasp of the hands. At the top of the upper curves of the two lateral parts $g$, which grasp the kettle or other vessel, I attach to them or to the middle folded part of the wire a metallic shelf $m$, which extends out over the contents of the vessel until its inward end is a little beyond a perpendicular line dropped from the hooks $a'$ $a''$, where the metal is bent upward, making a rest for the lower end of the knife, spoon, or fork, the bent-upward end of the shelf or part $m'$ making a ledge for it to rest in.

As intimated, my implement is especially designed for culinary operations, as cooking fruit for canning, frying out of lard, and the making of grape or other jelly, and has no reference to mere ornamental spoon-holders for table use.

Having described my invention, what I claim is—

1. A spoon-holder constructed of one continuous piece of wire, the extreme ends of which are formed in two opposing hooks and the middle formed into a loop to engage the inside of the vessel, two diverging loops formed on each side of the middle loop for engagement with the outer surface of the vessel, and a sliding band on the upper ends to vary the distance apart of the hooks, as set forth.

2. A spoon-holder constructed of one piece of wire formed into loops to embrace the edge of the vessel, furnished with angles near the point where the spoon-holder engages the top of the vessel, in combination with a shelf formed of a loop of wire whose inner side is bent upward to form a ledge $m'$ and furnished with eyes which rest on the said angles, as set forth.

GEORGE WASHINGTON BABCOCK.

Witnesses:
SAMUEL J. PARKER,
T. J. MCELHENY.